(12) United States Patent
Hall

(10) Patent No.: US 9,114,674 B2
(45) Date of Patent: Aug. 25, 2015

(54) SELF-INFLATING TYRE ASSEMBLY

(75) Inventor: Gregory Hall, Warwickshire (GB)

(73) Assignee: Fusion Innovations Ltd, Warwickshire (GB)

( * ) Notice: Subject to any disclaimer, the term of this patent is extended or adjusted under 35 U.S.C. 154(b) by 55 days.

(21) Appl. No.: 13/703,834

(22) PCT Filed: Jun. 29, 2011

(86) PCT No.: PCT/GB2011/000986
§ 371 (c)(1),
(2), (4) Date: Jan. 15, 2013

(87) PCT Pub. No.: WO2012/001360
PCT Pub. Date: Jan. 5, 2012

(65) Prior Publication Data
US 2013/0233459 A1    Sep. 12, 2013

(30) Foreign Application Priority Data

Jun. 29, 2010 (GB) .................................. 1010939.5

(51) Int. Cl.
| | | |
|---|---|---|
| *B60C 23/10* | (2006.01) | |
| *B60C 23/12* | (2006.01) | |
| *B60C 5/22* | (2006.01) | |
| *B60C 5/20* | (2006.01) | |

(52) U.S. Cl.
CPC . *B60C 23/12* (2013.01); *B60C 5/20* (2013.01); *B60C 5/22* (2013.01); *Y10T 137/0318* (2015.04); *Y10T 152/10522* (2015.01)

(58) Field of Classification Search
CPC ........ B60C 23/10; B60C 23/12; B60C 23/004
USPC .......................................... 152/419, 423–426
See application file for complete search history.

(56) References Cited

U.S. PATENT DOCUMENTS

| | | | | |
|---|---|---|---|---|
| 1,035,283 | A  * | 8/1912 | Wear .............................. | 152/425 |
| 1,793,429 | A  * | 2/1931 | Mascarenhas ................ | 152/425 |
| 4,293,017 | A | 10/1981 | Lambe | |
| 4,349,064 | A  * | 9/1982 | Booth .......................... | 152/418 |
| 6,076,580 | A | 6/2000 | Mazhar | |
| 6,533,010 | B1 * | 3/2003 | Alonso et al. ................. | 152/419 |
| 6,691,754 | B1 * | 2/2004 | Moore .......................... | 152/419 |
| 7,117,910 | B2 * | 10/2006 | Akahori ....................... | 152/426 |
| 2008/0289739 | A1 | 11/2008 | Bol | |

FOREIGN PATENT DOCUMENTS

LU           40103 A1      7/1961

OTHER PUBLICATIONS

Stemme, Erik; Stemme, Goran; A valveless diffuser/nozzle-based fluid pump; Sensors and Actuators A, 39 (1993) pp. 159-167; Sweden.

* cited by examiner

*Primary Examiner* — Jason Bellinger
(74) *Attorney, Agent, or Firm* — The Ollila Law Group LLC

(57) ABSTRACT

A tire assembly for a road vehicle is provided. The assembly includes a tire and first and second expandable chambers positioned within the tire. A series of actuators for selectively pumping air to the first and second chambers is provided, wherein the assembly includes a third chamber arranged between the first and second chambers. Each of the actuators is pneumatically connected to the first, second and third chambers by way of a radial air loop, wherein the radial air loop has a first chamber valve, a second chamber valve, an actuator valve, and a third chamber valve.

6 Claims, 8 Drawing Sheets

SELF-INFLATING TYRE ASSEMBLY

BACKGROUND OF THE INVENTION

The present invention relates to vehicle tyres and in particular, but not exclusively, to a passenger car tyre.

The vast majority of road vehicles, and particularly passenger vehicles, use a form of pneumatic tyre as the interface between the vehicle and the road surface. The characteristics of the tyre vary dependent on the road surface, the type of vehicle and the type of use of the vehicle. For example, a tyre for a heavy goods vehicle (HGV) will have a deep side wall relative to the tyre width in order to accommodate the weight of the vehicle and load. In contrast, a tyre for a performance car will have a shallow side wall in relation to the tyre width in order to minimise the wheel displacement relative to the road surface. A family saloon might have a tyre of intermediate side wall depth in order to provide improved comfort for the passengers of the vehicle, whilst still providing acceptable levels of vehicle handling performance.

However, a common feature of all tyres is a trade off between the grip generated between the tyre and the road surface (a function of the tyre coefficient of friction), and the rolling resistance of the tyre. Whilst increased grip is clearly beneficial with respect to vehicle safety, the increase in grip inevitably leads to an increased rolling resistance of the tyre, which can make the vehicle more noisy and less efficient when driving in a straight line.

Developments have been made to tyre compounds in order to optimize the trade off between tyre friction and rolling resistance. However this design point remains an issue for tyre designers attempting to improve the fuel consumption of the associated vehicle whilst maintaining tyre grip for cornering ability and vehicle safety.

One proposed solution to this problem is to provide a vehicle tyre assembly having a tyre formed from non-uniform tyre compound. Accordingly, the central portion of the tyre is made of a harder tyre compound which has a lower friction coefficient and correspondingly lower rolling resistance. Arranged on either side of the central portion are areas formed of a compound with higher coefficients of friction and correspondingly higher rolling resistance. As the vehicle speed increases (for example, consistent with the vehicle travelling in a straight line) the centrifugal growth associated with high speed rotation causes the central portion of the tyre to expand outwardly allowing the main contact point of the tyre with the road to be provided by the central hard compound section. In this way the rolling resistance of the tyre is reduced thereby reducing the fuel consumption of the car and at the same time reducing the wear of the softer compound, high friction sections on either side of the central portion.

However, it has been found that the relative centrifugal growth is often insufficient and the softer compound sections remain in contact with the road and wear accordingly. This in turn reduces the benefits of the variable compound tyre.

In order to overcome this problem, prior art devices teach the use of an actuator in order to additionally extend the central portion in a radial direction. However this solution is complex and presents problems in terms of operating the device upon sudden braking at high speed in that the actuator is unlikely to be able to retreat from the inner portion of the tyre sufficiently quickly to allow the outer soft compound portions to contact the road to provide for rapid braking.

Additionally, known systems require an external pressure source in order to operate. This adds substantial complexity to the system. Furthermore the use of an actuator to extend the central portion adversely affects the ride quality of the tyre since tyre compliancy is greatly reduced by the application of a high pressure over a low surface area of the tyre.

It is an object of the current invention to at least mitigate some of the above problems.

BRIEF SUMMARY OF THE INVENTION

Accordingly, there is provided a tyre assembly and a method of changing the outer profile of a tyre.

BRIEF DESCRIPTION OF THE SEVERAL VIEWS OF THE DRAWINGS

The invention will now be described, by way of example only and with reference to the following drawings, in which.

DETAILED DESCRIPTION OF THE INVENTION

Figure 1:
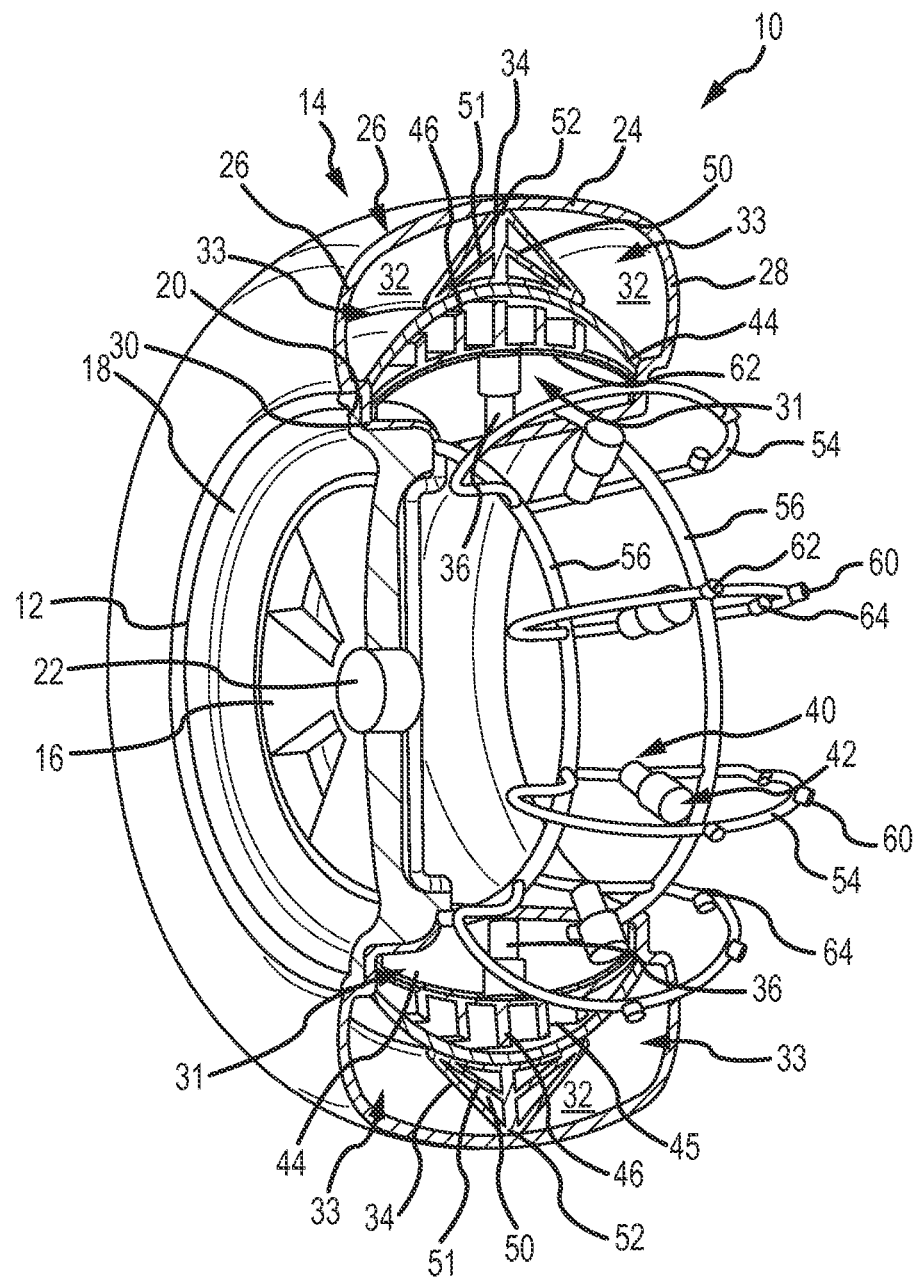
FIG. 1 is a sectioned perspective view of a tyre assembly of the current invention.

In FIG. 1 a wheel assembly 10 is shown having a wheel 12 on which is mounted a tyre assembly indicated generally at 14. The wheel 12 is a standard passenger vehicle wheel. It will be appreciated that alternative sizes and designs of wheel could be used without departure from the present invention. The wheel 12 has a series of spokes 16 which support an outer rim 18. The outer rim 18 has a lip 20 which retains the tyre as will be described in further detail shortly. The spoke 16 meets centrally at a hub 22 which is provided to mount the wheel onto a wheel hub of the associated vehicle (not shown for clarity) in a conventional way.

The tyre assembly 14 includes a tyre 24 which has an outer profile 26 for contacting the road surface. The outer profile 26 includes the side walls 28 which have a lower portion 30 which sits on the inside surface of the lip 20 of the wheel 12. This inside surface of the tyre 24 and the outer profile of the wheel 12 define a tyre cavity indicated generally at 32. Arranged within the cavity 32 is an actuator assembly indicated generally at 34.

The actuator assembly has an actuator 36 capable of pumping air upon compression. The actuator is located in an expandable chamber in the form of an inner low pressure chamber 31. A radially inner end 40 of the actuator 36 rests on the outer profile of the wheel 12. A radially outer end 42 of the actuator 36 rests against the underside of a first airtight membrane 44. Arranged on the radially outer side of the first airtight membrane 44 is a high pressure chamber 45 containing a spacer 46 the purpose of which will be described in further detail shortly. Disposed radially outwardly of the high pressure chamber 45 is a second airtight membrane 48 which acts to seal an outer lower pressure chamber 33 from the high pressure chamber 45. Arranged on top of the second airtight membrane 48 and positioned in the cavity 32 between the high pressure chamber 45 and the inner surface of the tyre 24 is a collapsible structure 50 the purpose of which will be described in further detail shortly. In this embodiment, the collapsible structure 50 is broadly triangular in shape having a top portion 52 designed to contact the inner surface of the tyre 24. The collapsible structure 50 is formed from a series of fins 51 which are designed to buckle under certain conditions to allow the structure 50 to collapse as will be discussed in further detail shortly.

Figure 2:
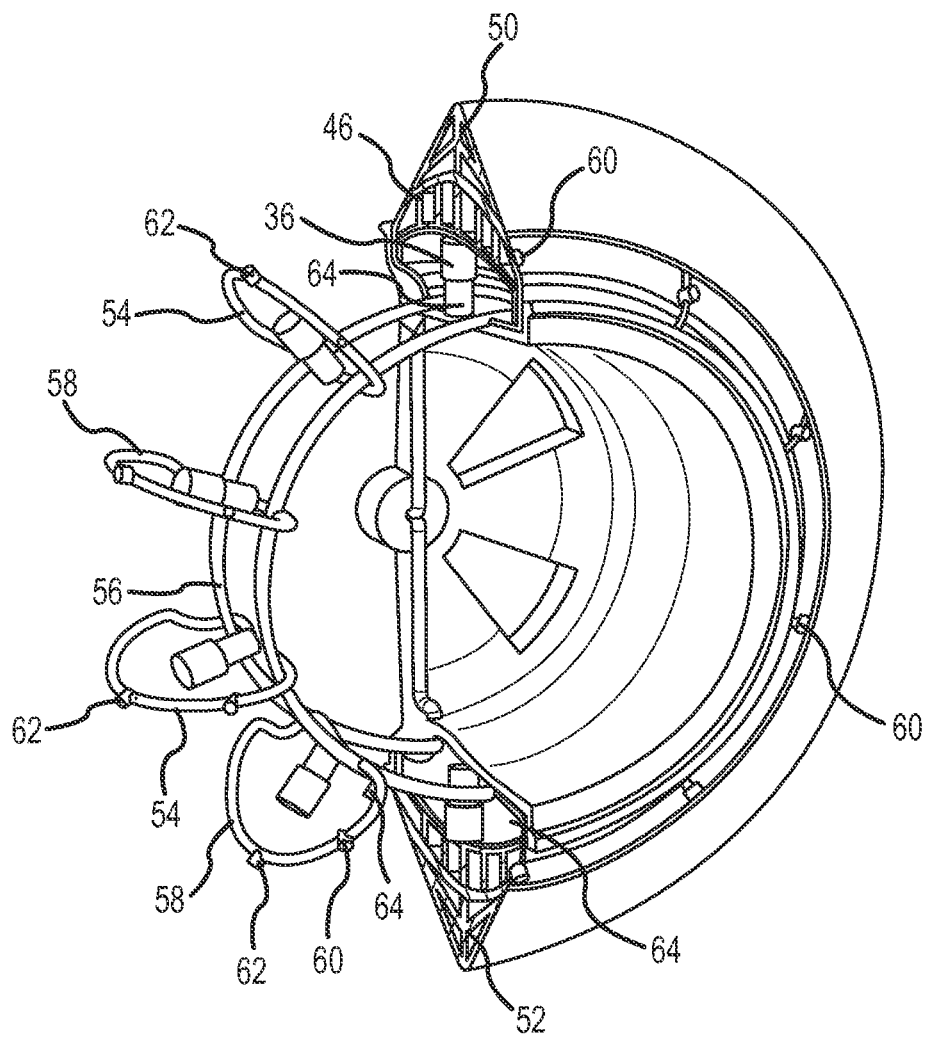
FIG. 2 is a sectioned perspective view of the tyre assembly of FIG. 1 with part of the tyre assembly removed.

Turning now to FIG. 2, the collapsible structure 50 and the spacer 46 can be seen in further detail. The fins 51 give a degree of structural rigidity to the structure 50 between the base of the structure where it contacts the spacer 46 and the top portion 52 of the structure 50. Accordingly, when air is applied to the inner low pressure chamber, the spacer 46 and the collapsible structure 50 move in a radially outward direction so that the top portion 52 of the collapsible structure 50 applies pressure to the inner surface of the tyre 24. Equally, when air is withdrawn from the inner low pressure chamber, the top portion 52 of the structure 50 retracts in a radially inward direction from the inner surface of the tyre 14. In this way, the expansion or contraction of the inner low pressure causes the profile of the tyre to alter, the purpose of which will be described in further detail shortly.

Referring to both FIGS. 1 and 2, it will be noted that the wheel assembly 10 is provided with a series of actuators 36 disposed at an equal radius about the wheel 12. Each of the actuators 36 are linked pneumatically by a series of air channels indicated generally at 54. Arranged within the air channels is a series of valves which are positioned so as to control the movement of air around the wheel assembly 10. The air channel 54 is formed from two peripheral tracks 56 which allow for air to be moved around the perimeter of the tyre 14, and a series of radial loops 58, each loop being associated with an actuator 36. Each radial loop 58 carries three valves, namely, an outer low pressure chamber valve 60 for controlling air flow into and out of the outer low pressure chamber 33, a high pressure chamber valve 62 which controls air flow into and out of the high pressure chamber 45, and an inner low pressure chamber valve 64 which controls the movement of air into and out of the inner low pressure chamber 31. Each of the valves is controlled by a controller (not shown for clarity) so as to provide for an optimised tyre profile as follows.

Figure 3:
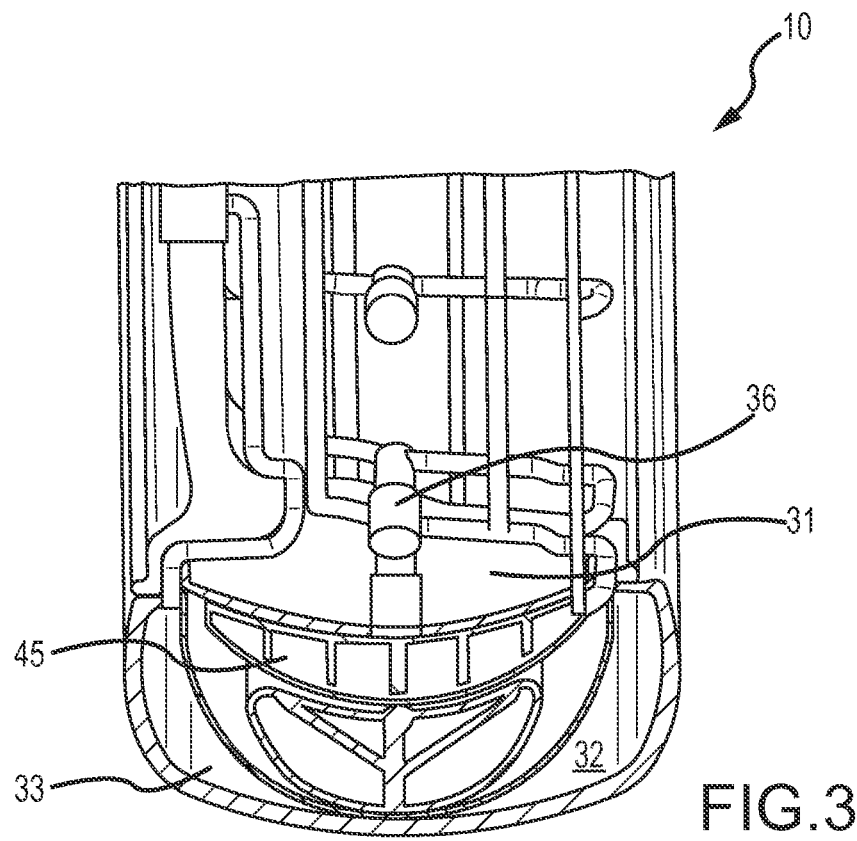
FIG. 3 is a sectioned plan view of part of the tyre assembly of FIG. 1 with the tyre assembly in its deployed position.

With the wheel assembly 10 in its retracted position as shown in FIG. 3, the pressure within the inner 31 and outer 33 low pressure chamber and high pressure chamber 45 is equal and all valves 60, 62, 64 are open.

Figure 4:
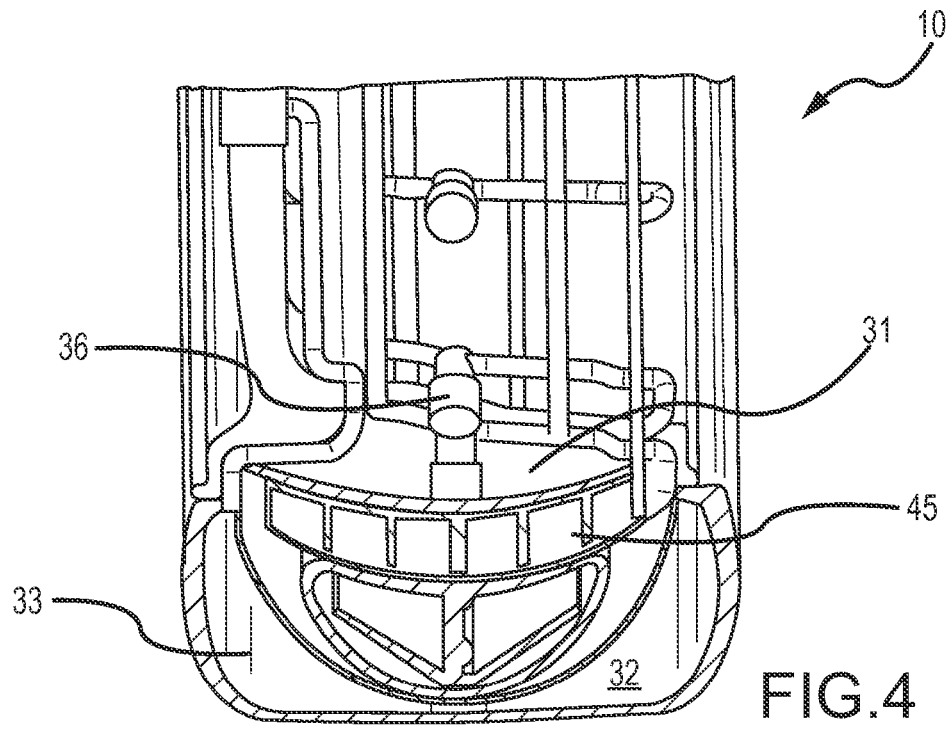
FIG. 4 is a sectioned plan view of part of the tyre assembly of FIG. 1 with the tyre assembly in its retracted position.

In order to activate the assembly to its deployed position as shown in FIG. 4, the valves 60, 62, 64 are operated to allow the actuators 36 to actuate the collapsible structure 50 between a deployed and retracted positions.

Figure 5:
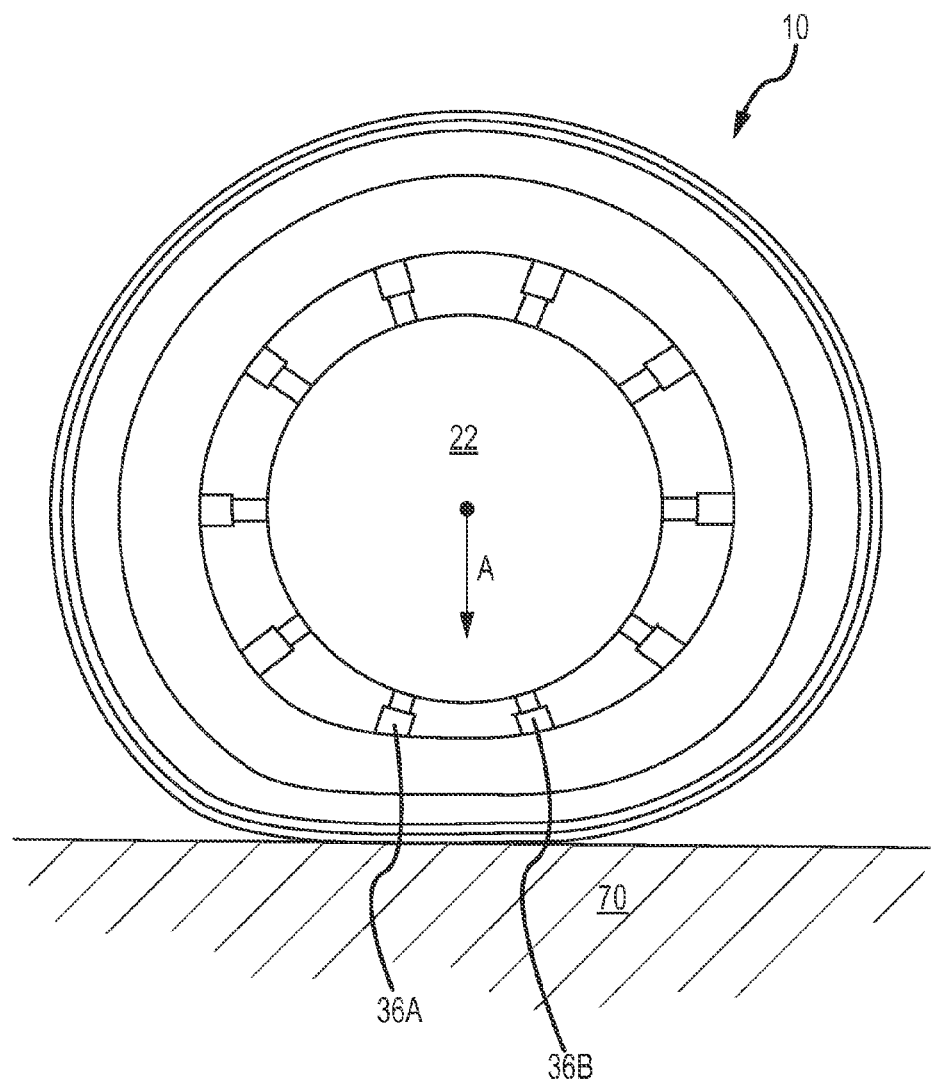
FIG. 5 is a plan view of the tyre assembly of FIG. 1, in use, and showing hidden detail.

Referring briefly to FIG. 5, the wheel assembly 10 is shown under the load of the vehicle which acts about the hub 22 in direction A. The reaction of the load by the road surface indicated generally at 70 causes a deformation of the tyre 24. This deformation causes the compression of the actuators 36A and 36B. Compressing the actuators 36 forces air from the actuators into the peripheral tracks 56. By opening the low pressure chamber valve 60 and high pressure chamber valve 62, the actuators pump air from the outer low pressure chamber into the high pressure chamber under compression resulting from the vehicle load acting on the actuators. As the wheel continues to rotate past the position shown in FIG. 5, the actuators 36 expand causing air to be drawn from the low pressure chamber 33 and into the actuators 36. Upon the next rotation of the wheel the air which resides within the actuators 36, that which was withdrawn from the low pressure chamber 33 on the previous rotation, is compressed by the vehicle load and is pumped into the high pressure chamber 45. This process is then repeated for each actuator 36 as the wheel rotates. This causes a transfer of air from the outer low pressure chamber 33 into the actuators 36 and from there into the high pressure chamber 45. The effect of this is to cause the high pressure chamber to become rigid thereby increasing the pumping efficiency of the actuators.

Once the high pressure chamber 45 has reached its deployed operating pressure the high pressure chamber valve is closed and the inner low pressure chamber valve opened to cause the flow of air from the outer low pressure chamber to the inner low pressure chamber under actuation of the actuators. This causes the high pressure chamber and collapsible structure to move radially outwardly causing the central portion of the tyre to also extend radially outwardly and the outside portions of the tyre to retract radially inwardly. This reduces the tyre footprint on the road which in turn reduces rolling resistance and noise. Thus the tyre allows the vehicle to travel with improved efficiency.

However, this reduced tyre profile would not be advantageous in all road conditions. Principally this mode of operation would be advantageous with a vehicle travelling at speed in a straight line. That said, the losses ratio between rolling friction, aerodynamic drag and braking force changes with vehicle dynamics. At lower speed the aerodynamic ratio is reduced increasing the rolling friction ratio. However, when the vehicle is cornering, it is advantageous to generate as much friction as possible between the tyre and the road surface in order to improve the handling and safety of the vehicle. Accordingly, the valves 60, 62 and 64, can be quickly opened upon the detection of lateral forces by the controller in order to equalise the pressure within the tyre and return the tyre to a normal outer profile.

Additionally, the collapsible structure 50 is designed to collapse under substantial lateral load or under sudden increases in radial load associated with heavy breaking of the vehicle. Under such circumstances the fins 51 which form the collapsible structure 50 buckle enabling the rapid collapse of the structure.

Figure 6:
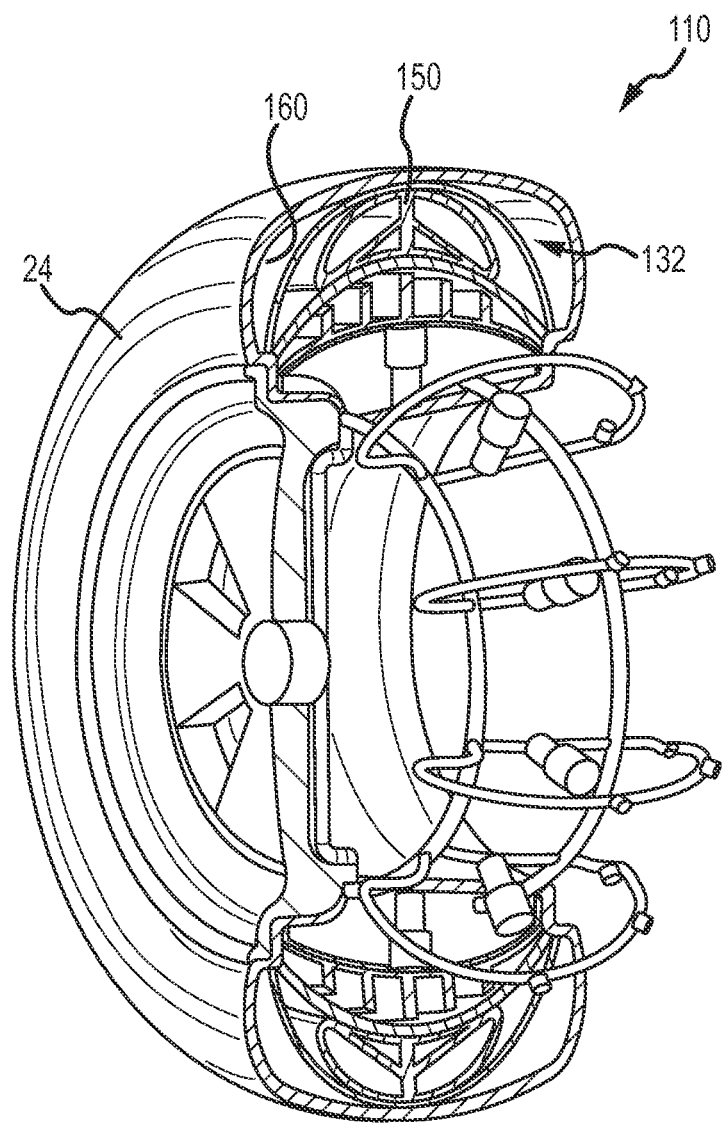
FIG. 6 is a sectioned perspective front view of an alternative embodiment of the tyre assembly of the current invention.
Figure 7:
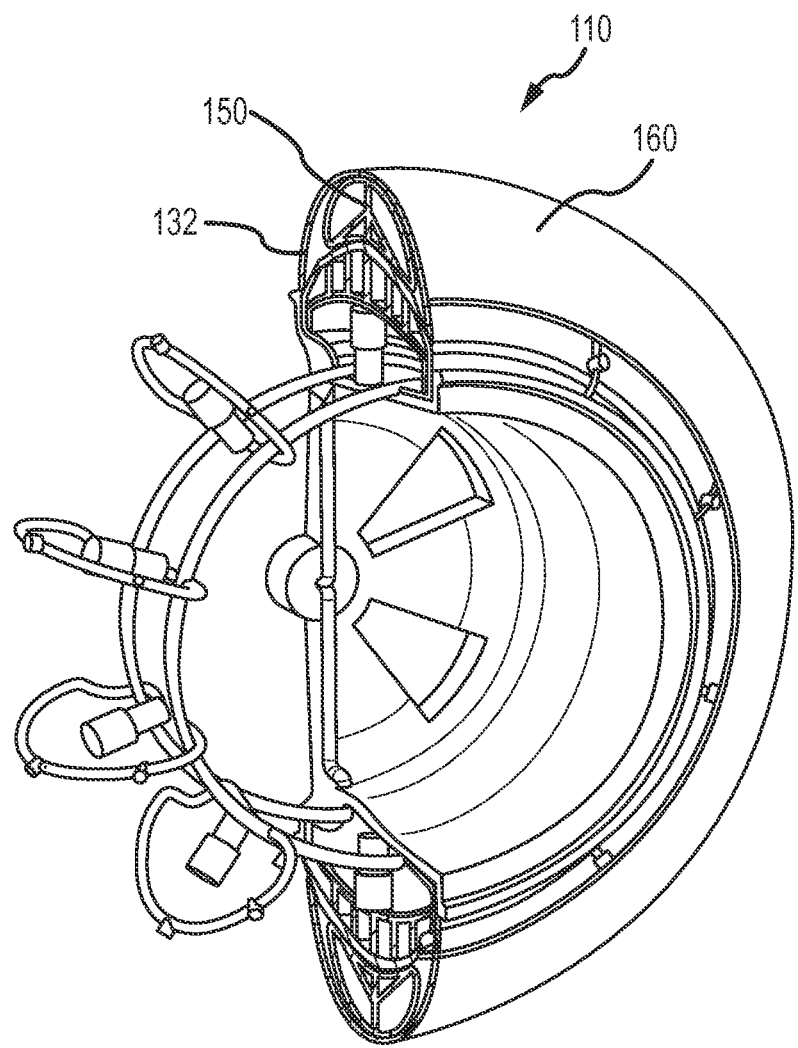
FIG. 7 is a sectioned perspective rear view of the tyre assembly of FIG. 6 with part of the tyre assembly removed.

Referring now to FIG. 6 an alternative embodiment of wheel assembly is shown indicated generally at 110. The wheel assembly 110 operates in the same manner as wheel assembly 10 with the exception that the collapsible structure 150 of the wheel assembly 110 has a more curved cross section than the triangular cross section of the collapsible structure 50 of FIGS. 1 and 2. Additionally, the wheel assembly 110 is provided with a shroud 160 positioned in the tyre cavity 132 so as to provide a slightly increased contact area between the collapsible structure 150 and the inner surface of the tyre 24. In all other respects, the features and mode of operation of the embodiment shown in FIGS. 4 and 5 are substantially alike those of the embodiment in FIGS. 1 and 2.

The advantages of the present invention are improved by the provision of a vehicle tyre formed from a compound which varies across the width of the tyre. A hardwearing, relatively low friction central portion is provided to accentuate the advantages of the reduced tyre footprint when the tyre assembly is in the actuated position. Arranged on either side of the reduced friction compound area are high friction areas which provide increased grip when the tyre is in the retracted profile.

Figure 8:
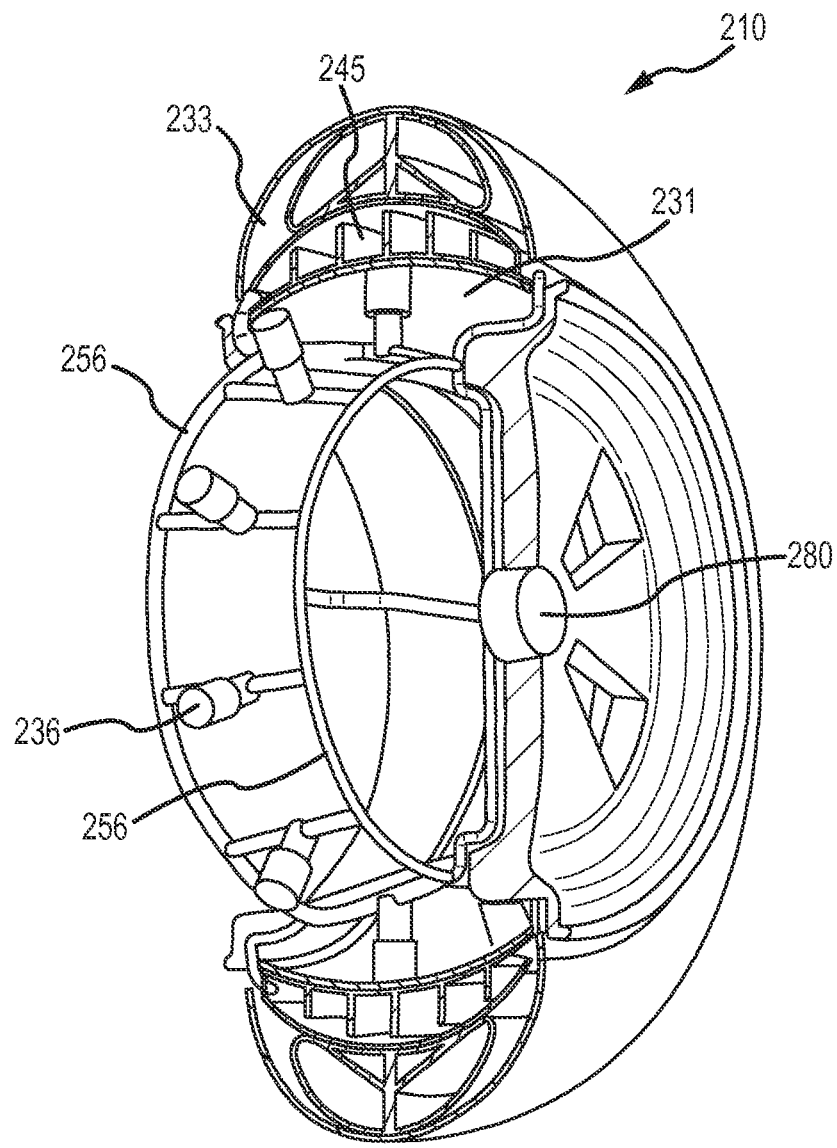
FIG. 8 is a sectioned perspective view of the front of a second embodiment of tyre assembly of the current invention.
Figure 9:
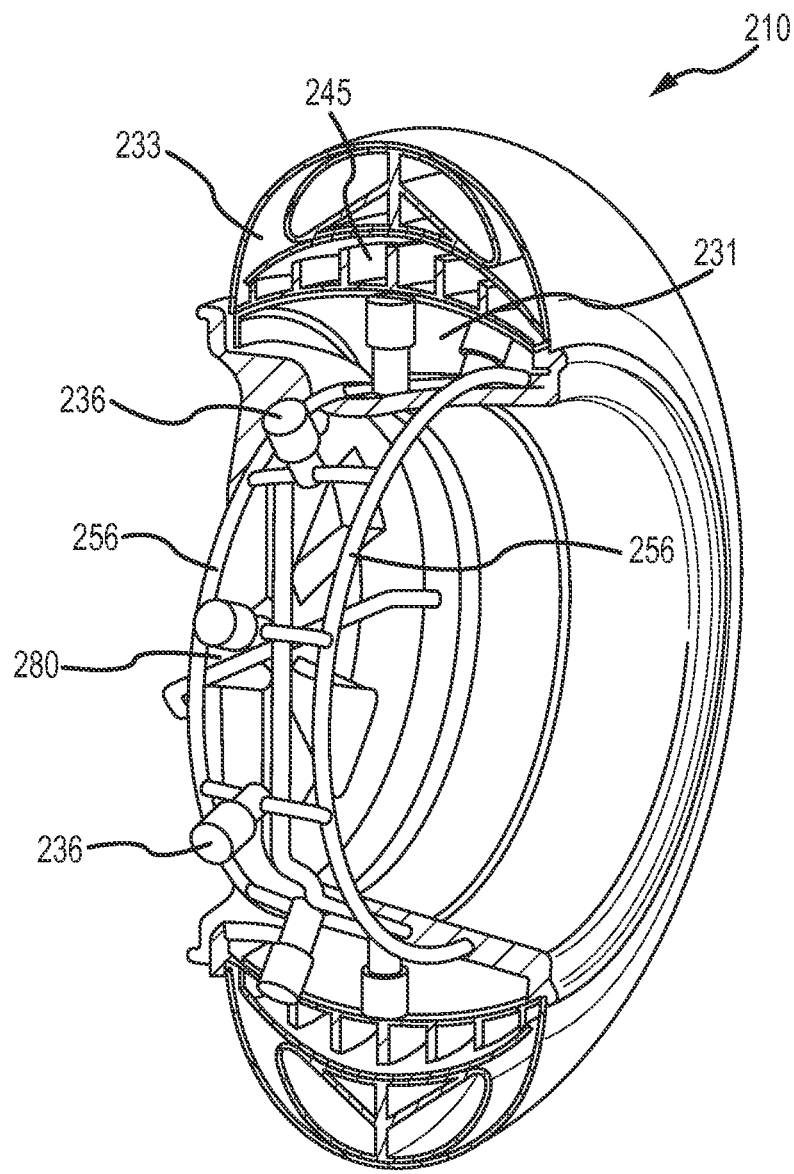
FIG. 9 is a sectioned perspective view of the rear of a second embodiment of the tyre assembly of FIG. 8.

In FIG. 8 a further alternative embodiment of wheel assembly 210 is shown which differs from the wheel assemblies 10 and 110 as follows.

Each of the actuators 236 is pneumatically connected to the peripheral tracks 256. The peripheral tracks 256 are in turn pneumatically connected to the inner and outer low pressure chambers 231, 233 and high pressure chamber 245. Each of the low pressure chambers 231, 233 and high pressure chamber 245, is pneumatically connected to a central regulator indicated generally at 280. The central regulator 280 is controlled to permit the passage of air from the compressed actuator 236, as described with respect to the earlier embodiments, into the high pressure chamber 245 and inner lower pressure chamber in order to alter the profile of the tyre. Thus, instead of the multiple valves 60, 62, 64 arranged on the radial loops 58 of the second and first embodiments, this embodiment provides for the manifolded control of the actuation of the tyre via the central regulator 280. The wheel assembly 210 is also provided with a reservoir located within the inner low pressure chamber 231 which is not shown for clarity which provides the regulator 280 with additional air to inflate the high pressure chamber 245 when necessary as will be described in further detail shortly.

In use, the regulator 280 is controlled as follows in order to control the passage of air within the wheel assembly 210. The actuators 236 compress under rotation of the wheel as described above forcing air into the peripheral channels 256 and from there via the regulator 280 into the high pressure chamber 245. Once the high pressure chamber has reached its operating pressure, air is pumped through the regulator 280 from the outer lower chamber and from there into the inner low pressure chamber 231. Once the low pressure chamber 231 has achieved sufficient pressure to deploy the high pressure chamber and collapsible structure the regulator shuts off the air supply into the low pressure chamber 231 with the wheel assembly in its deployed state. Additionally, or alternatively, the regulator can draw air from the outer low pressure chamber 233 in order for it to be pumped into the high pressure chamber 245. The regulator also controls air flow to and from the reservoir as required in order to elevate the pressure in either of the low pressure chambers 231, 233 or the high pressure chamber 245.

The regulator also permits air to be drawn from or vertical to atmosphere in order to increase or decrease overall tyre pressure or pressure in a specific cavity.

It will be appreciated that the actuator could take many forms with the scope of the invention. For example in the alternative to the piston arrangement shown herein the actuator may take the form of a flexible expandable chamber.

The invention claimed is:

1. A tyre assembly for a road vehicle, the assembly including a tyre, first and second expandable chambers positioned within the tyre, and a series of actuators for selectively pumping air to the first and second chambers, wherein the assembly includes a third chamber arranged between the first inner and second chambers, wherein each of the actuators is pneumatically connected to the first, second and third chambers by way of a radial air loop and wherein the radial air loop has a first chamber valve, a second chamber valve an actuator valve and a third chamber valve.

2. The assembly of claim 1 wherein the actuators are positioned at an equal radius on the inner surface of the tyre assembly.

3. The assembly of claim 1 wherein the actuators are pneumatically connected to one another by way of an air channel.

4. The assembly of claim 3 wherein compression of an actuator by application of the vehicle load causes air to be pumped into the air channel.

5. The assembly of claim 1 wherein the actuators and first, second and third chambers are pneumatically connected by way of a central regulator.

6. A method of changing the outer profile of a tyre, the method including the steps of providing a tyre having a tyre cavity, first and second expandable chambers and a third chamber arranged between the first inner and second chambers, and a series of actuators positioned within the tyre, wherein each of the actuators is pneumatically connected to the first, second and third chambers by way of a radial air loop and wherein the radial air loop has a first chamber valve, a second chamber valve, an actuator valve and a third chamber valve; the method further including the step of controlling the flow of air from the actuators to the expandable chambers upon compression of the actuators due to rotation of the wheel.

* * * * *